Nov. 12, 1968  G. L. POULOS  3,410,572
TANDEM DRIVE AXLE SUSPENSION
Filed March 18, 1966  2 Sheets-Sheet 2
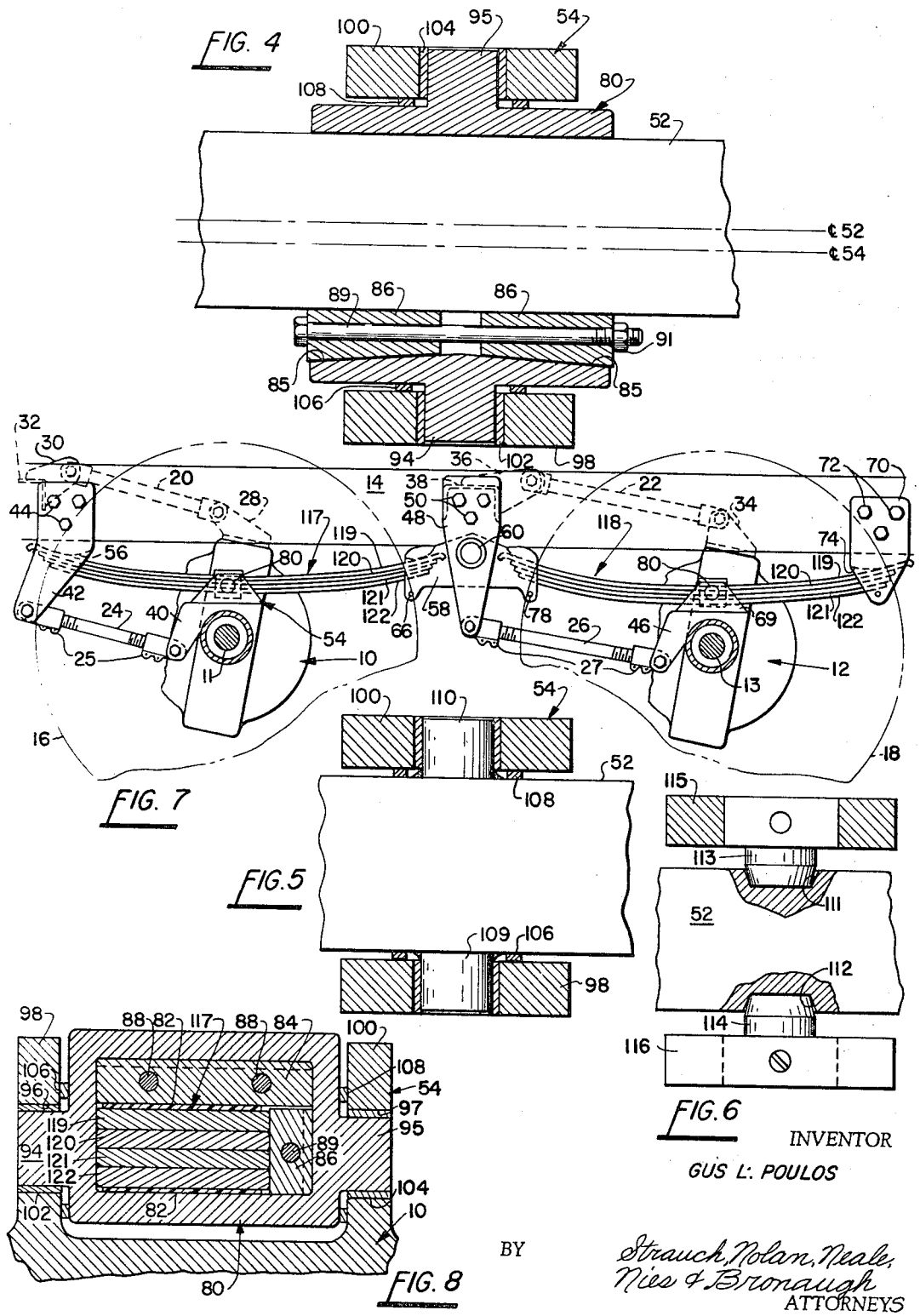
INVENTOR
GUS L. POULOS
BY
Strauch, Nolan, Neale,
Nies & Bronaugh
ATTORNEYS

United States Patent Office 3,410,572
Patented Nov. 12, 1968

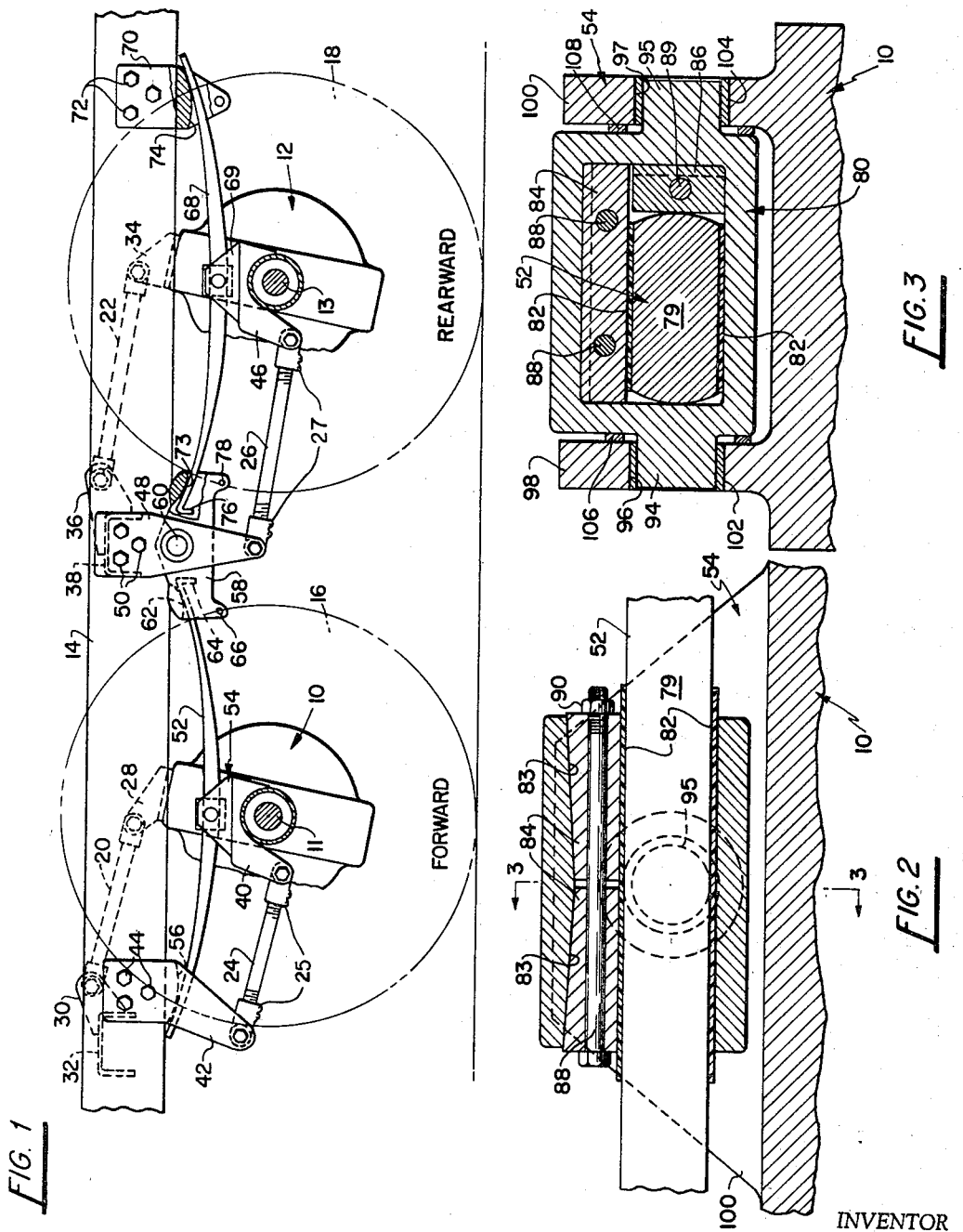

3,410,572
TANDEM DRIVE AXLE SUSPENSION
Gus L. Poulos, Rochester, Mich., assignor, by mesne assignments, to Rockwell-Standard Company, Pittsburgh, Pa., a corporation of Delaware
Filed Mar. 18, 1966, Ser. No. 535,392
12 Claims. (Cl. 280—104.5)

ABSTRACT OF THE DISCLOSURE

A tandem drive axle spring suspension comprises at each side of the vehicle a pair of leaf spring units, each unit being pivoted intermediate its ends upon an axle housing on an axis that is substantially parallel to the axle, equalizers pivoted intermediate their ends on the vehicle frame on a transverse axis and connected between adjacent ends of the spring units at each side, connections between each of the other ends of the spring units and the vehicle frame and a series of torque rods pivotally connected at opposite ends on parallel transverse axes to extend between the axle housings and the frame and define at each axle a flexible parallelogram linkage connecting the axle to the frame.

---

The present invention refers to tandem axle suspensions for vehicles and particularly to tandem drive axle spring suspensions having springs individual to the respective axles and parallelogram type torque rod connections between the axles and the vehicle frame.

In general, in prior tandem drive axle assemblies embodying parallelogram type torque rod arrangements of which U.S. Patent No. 2,755,097 to E. V. Elconin is typical, the axles are usually suspended on each side of the vehicle by a large multiple leaf spring or rigid walking beam which is intermediately pivotally supported on the frame between the axles with the spring or beam ends operatively connected to the forward and rear axles of the tandem assembly. Although this arrangement provides a rugged high load carrying suspension, its inherent rigidity renders it subject to a number of adverse driving forces especially pronounced under diagonal articulating conditions of the axles which introduce undue stresses into the suspension components and usually make steering difficult.

It has been recognized that a more flexible suspension, preferably with individual springs for each drive axle, was desirable but until the present invention no satisfactory solution has been proposed or adopted due to difficulties encountered in making a highly flexible but lighter weight suspension of equal load carrying capacity for the parallelogram torque rod type driving tandem axle assembly.

In non-driven tandem axle assemblies such as installed in trailers, individual leaf springs for each axle to provide a smoother ride and improved axle articulation have been employed for some time, a pair of springs on each side of the vehicle usually being mounted on the respective axles and interconnected at adjacent ends by equalizing means which transfers load from one spring to the other instead of to the frame. Such suspensions are disclosed for example in U.S. Patents No. 2,577,322 to V. L. Frazier and No. 2,900,197 to C. T. Hutchens. Prior to the present invention it has always been believed that such equalizing spring arrangements are not applicable to driving axle tandem assemblies due to drive line damage arising from the changing spacing and positions of the drive axles relative to each other during normal axle articulation when the vehicle is in operation.

Recently there has been wide-spread use of relatively long accurately formed tapered single leaf springs to replace customary heavy multi-leaf springs in vehicle suspensions, with attendant advantages of less unsprung weight and smoother ride, and in its preferred embodiment the invention concerns the adaptation of such springs to relatively heavy duty tandem drive axle spring suspensions.

The present invention provides as its major object novel suspension arrangements by which relatively light weight and highly flexible long tapered single leaf springs can be used to advantage in driving tandem axle bogies of the parallelogram torque rod type, for improved axle articulation.

Another object of the invention is to provide a novel tandem drive axle assembly wherein a pair of leaf spring units which may be single leaf springs or multi-leaf springs on each side of the vehicle are pivotally secured to their associated drive axles and connected between the axles by equalizing means.

Another object of the invention is the provision of a lightweight suspension assembly for a tandem drive axle comprising single leaf springs individually pivotally secured to the respective axles and interconnected at each side of the vehicle by equalizing means such as an intermediately pivoted lever on the frame betwen the axles to provide a smoother ride and improved articulation of the driving tandem.

A more specific embodiment of the invention resides in a novel pivotal connection between each spring unit and the axle wherein the intermediate section of the spring unit is secured within a special housing provided with transverse trunnions that pivot upon an axle bracket. According to other objects of the invention, such trunnions may be rigidly formed on opposite side edges of a single spring leaf, or the spring leaf may be recessed to receive opposite trunnions on the axle bracket.

Further objects of the invention will become apparent or specifically pointed out in the following description and in the claims in connection with the appended drawing wherein:

FIGURE 1 is a side elevation partly in section showing part of a vehicle supported by tandem drive axle assembly according to a preferred embodiment of the invention;

FIGURE 2 is a fragmentary longitudinal cross section through the spring seat mounting of one of the springs on its axle;

FIGURE 3 is a transverse section along line 3—3 of FIGURE 2;

FIGURE 4 is a plan view in cross section showing further detail of the spring mounting on the axle;

FIGURE 5 is a fragmentary plan view in section showing an embodiment wherein the spring leaf is directly trunnioned on the axle bracket;

FIGURE 6 is a fragmentary view showing a single leaf spring pivoted on bracket trunnions according to a further embodiment of the invention;

FIGURE 7 is a view like FIGURE 1 but showing multi-leaf springs in the suspension; and FIGURE 8 is a section like FIGURE 2 but through the multi-leaf spring seat mounting.

FIGURE 1 shows a tandem drive axle assembly comprising forward drive axle 10 and rear drive axle 12 disposed beneath vehicle frame 14 and adapted to drive ground engaging wheels 16 and 18 at each side of the vehicle. Axles 10 and 12 are restrained and guided in vertical movement during operation of the vehicle by a parallelogram type torque rod arrangement comprising front and rear upper torque rods 20 and 22 and front and rear lower torque rods 24 and 26 parallel to the respective upper torque rods. The lower torque rods 24 and 26 have adjustable connections 25 and 27 respectively at their ends so that these rods are effectively adjustable in length for obtaining proper axle alignment during installation.

Front upper torque rod 20 is rearwardly pivotally connected to bracket 28 on the top of forward drive axle housing 10 and forwardly pivotally connected to a bracket 30 fixed to a frame cross member 32. Rear upper torque rod 22 is similarly pivotally connected at its rear end to a bracket 34 on the top of rear drive axle housing 12 and at its forward end to a bracket 36 fixed to a frame cross member 38. Front lower torque rod 24 is rearwardly pivotally connected to a bracket 40 extending from the housing of forward drive axle 10. The front end of lower torque rod 24 is pivotally connected to the lower end of a depending spring hanger bracket 42 secured to frame 14 as by bolts 44. Rear lower torque rod 26 is pivotally connected at its rear end to a bracket 46 on the housing of rearward axle 12, and at its front end to the lower end of a hanger bracket 48 secured to the frame as by bolts 50 midway between the axles 10 and 12.

At each axle the upper and lower rear torque rods are parallel and define sides of a flexible parallelogram for guiding and restraining the axles to substantially vertical movements relative to the frame during vehicle operation over uneven roadway surfaces. The torque rods also transfer brake and driving torque reactions from the axle to the frame. It will be understood that a pair of lower front and rear torque rods will usually always be used at each axle, one at each outer end of the axles, but it is in most cases sufficient to employ only single upper torque rods for each axle transversely located near the centerline of the vehicle.

In the invention the load carrying spring suspension comprises a pair of single leaf springs one at each side of each axle which are connected to and between the axles and the frame in a novel manner, so that the springs carry the vehicle load only without any demand for axle guidance or load transfer, thus greatly reducing load stresses. The springs are so supported on their respective axles as to allow substantially unrestricted articulation without subjecting them to undue stresses.

As shown in FIGURE 1, two longitudinally aligned and spaced single leaf springs are mounted at each side of the vehicle. Spring 52 for the forward axle 10 is pivotally secured intermediate its ends in a spring seat bracket 54 on the top of the housing of axle 10. The forward end of spring 52 extends into forward spring hanger 42 and bears slidably against a convex wear surface 56 within the hanger. The rear end of spring 52 extends within an equalizer member 58 pivoted at 60 within hanger 48 and bears slidably against a convex surface 62 within the equalizer member. To prevent the rear end of spring 52 from being jarred out of the equalizer during axle articulation, the end of the spring is bent downward to form a hook 64 which, in extreme conditions, may hook over a fixed pin 66 within the lower end of equalizer member 58 to prevent separation of spring 52 from member 58. Pivot 60 is midway between axles 10 and 12 and parallel to the torque rod pivots.

Spring 68 for rear axle 12 is likewise pivotally secured intermediate its ends in a spring seat bracket 69 on top of the housing of axle 12. The rear end of spring 68 extends into a hanger bracket 70 secured as by bolts 72 to frame 14 and slidably bears against a convex wear surface 74 within hanger 70. The forward end of the spring 68 extends into the rear end of the equalizer member 58 where it slidably bears on a convex wear surface 73 and is formed with a hook portion 76 adapted to engage a pin 78 to prevent separation of the spring from the equalizer during extreme articulating conditions.

The spring ends are thus all free to slide longitudinally of the vehicle and, by means of the intermediate equalizer member which connects adjacent ends of the two springs at each side, the vehicle load on frame 14 is equally distributed between the axles. Hangers 42 and 70 and equalizer 58 effectively confine the spring ends against displacement transversely of the vehicle. Both sides of the vehicle are equipped with the suspension arrangement shown in FIGURE 1, thus requiring a total of four single leaf springs for the tandem drive axle suspension.

In order to reduce high bending stresses at the intermediate spring seat area and to provide for improved axle articulation, the springs are each supported on their respective axle housings for independent oscillation about axes transversely of the vehicle. Since the spring seat mountings at all of the axles are alike, only one is illustrated at FIGURES 2–4 and will be described in detail.

Each of springs 52 or 68 is a single leaf of spring steel accurately formed and comprising a thicker center section and tapered end sections which are of continually decreasing thickness tapering from the center section toward both ends of the spring. These springs are preferably of the type disclosed in U.S. Letters Patent No. 3,145,984 issued Aug. 25, 1964 to which reference is made for any further detail necessary to understand the present invention.

FIGURE 1 shows the drive axles 10 and 12 as comprising drive axle shafts 11 and 13 respectively which extend outwardly from differential mechanisms within the axle housings. These differential mechanisms are preferably driven from the vehicle power plant in a conventional manner as for example that disclosed in U.S. Letters Patent No. 2,825,145 wherein drive mechanism such as a propeller shaft section is connected between the drive axles, and the invention has the real advantage of protecting such drive mechanism against damage during axle articulation. The uniform thickness central section 79 of spring 52 is secured within a rectangular housing 80 open at opposite ends longitudinally of the vehicle to allow the spring to pass therethrough. Preferably both the flat upper and lower surfaces of the spring at the intermediate seat area within housing 80 are provided with liners 82 of a hard smooth sheet plastic material such as polyurethane or the like to reduce wear.

In order to clamp spring 52 within housing 80 to prevent longitudinal and lateral movement, sets of top wedges 84 and side wedges 86 are inserted from opposite ends of the housing and the respective wedges are pulled into place by tie rod bolts 88 and 89 extending through each pair of oppositely disposed wedges and tightened by nuts 90 and 91 respectively.

As shown in FIGURE 2, the upper inner surface of housing 80 is formed with oppositely inclined surfaces 83 which slidably engage the upper inclined sides of wedges 84, the lower flat sides of wedges 84 bearing on liner 82. Thus when nuts 90 are drawn tight spring 52 is located and clamped vertically in housing 80.

As shown in FIGURE 4 one inner side of housing 80 is formed with oppositely inclined surfaces 85 upon which slide wedges 86 interposed between those surfaces and a side edge of the spring leaf, so that when nut 91 is tightened the spring leaf is clamped laterally within housing 80.

Housing 80 is provided with opposed rigid trunnions 94 and 95 extending therefrom transversely of the spring length. These trunnions may be integral with the housing or welded thereon as desired. Trunnions 94 and 95 extend into apertures 96 and 97 of a spaced pair of upstanding walls 98 and 100 of spring seat bracket 54 and these apertures are lined with bushings 102 and 104. Thus housing 80 is freely pivoted on the axle housing to rock about an axis parallel to the axle length. To reduce wear between spring housing 80 and the walls of bracket 54 spacer washers 106 and 108 may be placed therebetween. Washers 106 and 108, besides providing friction bearing surfaces, absorb thrust loads and help to prevent the axis of housing 80 from binding during vehicle operation.

FIGURE 5 illustrates a further embodiment of the invention wherein the spring leaf at each axle is provided with aligned rigid welded-on trunnions 109 and 110 on opposite sides for direct mounting of the spring within the bearing apertures of axle housing bracket 54, instead of in a housing such as that at 80 of FIGURES 2–4. In this structure the thrust bearing and spacer washers 106 and 108 are interposed directly between bracket arms 98 and 100 and the opposite sides of the spring leaf.

FIGURE 6 shows a further embodiment in the combination of FIGURE 1 wherein the opposite sides of each single leaf spring 52 are formed with aligned bearing recesses 111 and 112 that rotatably receive the non-rotatable trunnions 113 and 114 fixed to the rigid axle bracket arms 115 and 116.

FIGURES 7 and 8 show a further embodiment like FIGURES 1 and 2 but wherein multileaf spring units 117 and 118 are used instead of the single leaf spring units. Spring leafs 119, 120, 121 and 122 are stacked in assembly as shown in FIGURE 8 and the stack is wedgedly mounted in the housing 80 as in FIGURE 2.

While the longitudinal center lines of the spring units may be somewhat offset relative to the axle bracket as indicated in FIGURE 4, this is of no operational significance. The size of spring housing 80 in all embodiments is chosen to accommodate spring units of different width and thickness.

Thus, in the invention each spring is free to oscillate on its axis on a pivot whose axis is parallel with the axis of the axle and which axis may pass through the spring unit as illustrated. Each spring is confined at the axle pivot against longitudinal or transverse shift relative to the axle. During articulation of the suspension, when the axles swing up or down along a path determined by the parallel torque rods, each spring oscillates about its pivot. This is advantageous because if each spring was bolted to the axle as in conventional drive axle arrangements stresses imposed at the seat area due to the associated parallelogram torque rod linkage would be extremely high and cause early spring failure at the seating area.

An advantage of the embodiments of FIGURES 2–4 and 8 is ease of assembly and disassembly, since only the tie rod nuts 90 and 91 need to be loosened or tightened to either free or clamp the spring.

The present invention may be embodied in other forms without departing from the spirit or essential characteristics thereof and therefore the present embodiments are to be considered in all respects as illustrative only and not restrictive, the scope of the invention being indicated by the appended claims rather than by the foregoing description.

What is claimed and desired to be secured by Letters Patent is:

1. A spring suspension for a tandem drive axle assembly in a vehicle having a frame disposed above transversely extending forward and rearward drive axles of said assembly comprising at each side of the vehicle a pair of leaf spring units each mounted intermediate its ends in a spring mounting upon the housing of a respective one of said axles, an equalizer member at each side of the vehicle pivoted intermediate its ends on said frame to rock about an axis transversely of the vehicle and disposed longitudinally between the spring units at that side, means operably connecting the adjacent ends of said spring units to said member, means operably connecting the other ends of said spring units to said frame, trunnion means in said spring mountings providing free rocking movement of said spring units about respective axes substantially parallel to said axles, and a series of torque rods pivotally connected at opposite ends on parallel transverse axes to extend between said axle housings and the frame and define at each axle a flexible parallelogram linkage connecting the axle to the frame.

2. In the spring suspension defined in claim 1, each of said spring units being a single leaf spring.

3. In the spring suspension defined in claim 2, each axle housing mounting an upstanding bracket having spaced arms, and each spring mounting comprising opposed fixed axis trunnions on said arms received in bearing recesses on opposite sides of the spring leaf.

4. In the spring suspension defined in claim 1, said torque rods being of adjustable length independently connecting each of said drive axles to the frame.

5. In the spring suspension defined in claim 1, the opposite ends of said spring units being longitudinally slidably connected to the frame and said member.

6. In the spring suspension defined in claim 1, said leaf spring units each being a single integral spring leaf characterized by a thicker intermediate section at said spring mounting on the axle and end sections wherein the spring is of continually decreasing thickness tapering from said intermediate section toward its opposite ends.

7. In the spring suspension defined in claim 1, said parallelogram linkage at each axle comprising parallel lower torque rods pivotally connected between the axle housing and the frame at the opposite ends of the axle and at least one upper torque rod pivotally connected between the axle housing and the frame, and means for adjusting the length of each of said lower torque rods, all of said torque rods extending longitudinally of the vehicle between transverse pivots substantially parallel to the spring pivots on the axis.

8. In the spring suspension defined in claim 1, each said spring mounting on the axle housing comprising a longitudinally open hollow housing through which the spring unit extends, means for tightly clamping the intermediate section of said spring unit within said housing, opposed trunnions on said housing, and bearings on said axle housing freely rotatably receiving said trunnions.

9. In the spring suspension defined in claim 8, said means for clamping the spring unit within the housing comprising wedges inserted between the spring unit and the interior of the housing and releasable fastening means for said wedges.

10. In the spring suspension defined in claim 1, hard plastic wear reduction liners interposed between the upper and lower surfaces of each said spring unit and the adjacent mounting surfaces.

11. In the spring suspension defined in claim 1, each axle housing having spring mounting arms, and each spring mounting comprising opposed trunnions extending between opposite sides of the spring leaf and said arms.

12. In the spring suspension defined in claim 1, each of said spring mounting axes passing through the associated spring unit.

References Cited

UNITED STATES PATENTS

| | | | |
|---|---|---|---|
| 2,624,593 | 1/1953 | Stover | 280—104.5 |
| 2,681,812 | 6/1954 | Stover | 180—22 X |
| 2,900,197 | 8/1959 | Hutchens | 280—104.5 |
| 3,157,412 | 11/1964 | Frazier | 280—104.5 |
| 3,166,142 | 1/1965 | Frazier | 280—104.5 |
| 3,305,231 | 2/1967 | Boughner | 267—52 |

PHILIP GOODMAN, *Primary Examiner.*

UNITED STATES PATENT OFFICE
CERTIFICATE OF CORRECTION

Patent No. 3,410,572

November 12, 1968

Gus L. Poulos

It is certified that error appears in the above identified patent and that said Letters Patent are hereby corrected as shown below:

Column 6, line 31, "axis" should read -- axles --.

Signed and sealed this 10th day of March 1970.

(SEAL)
Attest:

Edward M. Fletcher, Jr.
Attesting Officer

WILLIAM E. SCHUYLER, JR.
Commissioner of Patents